United States Patent [19]

Kast et al.

[11] 4,085,821
[45] Apr. 25, 1978

[54] LUBRICATION SYSTEM

[75] Inventors: Philip J. Kast, Madison; James F. Schmitt, Marshall, both of Wis.

[73] Assignee: Madison-Kipp Corporation, Madison, Wis.

[21] Appl. No.: 720,816

[22] Filed: Sep. 7, 1976

[51] Int. Cl.² .............................................. F16N 7/24
[52] U.S. Cl. .................................. 184/15 A; 184/6.19
[58] Field of Search ................. 184/15 A, 15 R, 15 B, 184/3 R, 6.19; 198/1

[56] References Cited

U.S. PATENT DOCUMENTS

| | | | |
|---|---|---|---|
| 1,840,934 | 1/1932 | Craig et al. | 184/15 R |
| 2,696,277 | 12/1954 | Schweisthal et al. | 184/15 A |
| 3,116,810 | 1/1964 | Olson | 184/15 B |
| 3,135,355 | 6/1964 | Olsen et al. | 184/15 R |
| 3,869,023 | 3/1975 | Thomson et al. | 184/15 A |

Primary Examiner—David H. Brown
Attorney, Agent, or Firm—Merriam, Marshall & Bicknell

[57] ABSTRACT

A lubricating device for delivering multiple clean shots of lubricant to a moving conveyor or the like, comprises an electric motor, a positive displacement lubricant pump having a plurality of individual cylinders and associated pistons driven by a common shaft, a single revolution clutch coupling the output of the motor to the shaft of the lubricant dispenser, and a sensing and control system actuated by the moving conveyor which at an appropriate time causes the clutch to engage the motor to the shaft of the lubricant pump for a single revolution, causing the ejection of a plurality of individual clean shots of lubricant which are directed to selected portions of the conveyor system by individual conduits.

5 Claims, 1 Drawing Figure

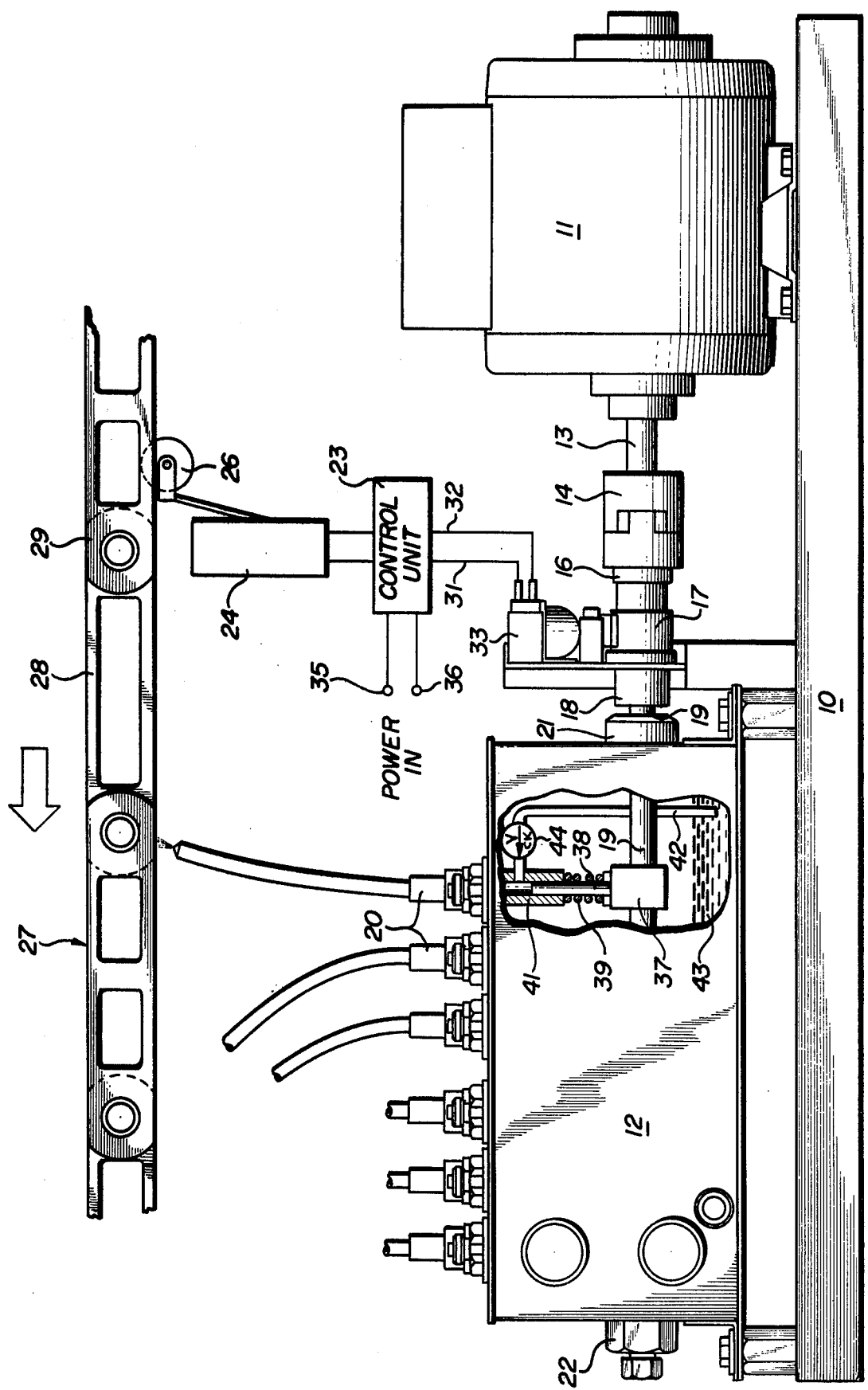

LUBRICATION SYSTEM

This invention relates to a new and improved apparatus for lubricating conveyor equipment and the like, and more particularly to a lubricating system which can deliver clean shots of lubricant to a plurality of points in a conveyor chain or similar system while the chain is moving.

In the lubrication of conveyor systems and the like, it is important that the lubricating device be able to provide a clean shot of lubricating fluid to one or more particular points on the conveyor chain and trolleys as the chain travels past the lubricating station in the course of the conveyor operation. It is essential that the proper quantity of lubricant be supplied, since too little is obviously undesirable, while an excess can lead to operating problems resulting from dripping of the excess lubricant. Additionally, if the lubricating fluid is dispensed as a mist or spray, too much of the conveyor system will be coated with the lubricating fluid, a result which in some applications is entirely unacceptable. Accordingly, it is important that a lubricating system provide what is known as a clean shot, i.e., a repeatable quantity of lubricant of predetermined volume, which is ejected with a velocity sufficient to propel the shot of lubricant in any desired direction for a selected distance with a relatively flat trajectory such that the shot can be directed to hit a desired point in space-time and repeatedly contact this point independent of external factors such as chain speeds, fluid viscosity, ambient temperature and the like.

In U.S. Pat. No. 3,869,023, there is disclosed a lubricating system for delivering a clean shot of lubricant to selected points on a conveyor system, in which a mechanically driven pump located near the point to be lubricated is actuated by movement of the conveyor. While the system disclosed is effective in delivering a clean shot of lubricant, the fact that the power for driving the system is derived from the moving conveyor severely limits the number of different points in the conveyor which can be lubricated simultaneously. In addition, the operating speed of the mechanically driven pump is limited to about 350 shots per minute or less, thus making the system possible unsuitable for high-speed conveyor systems. Further, the location of the pump on the conveyor system itself makes maintenance thereof more difficult than that required with a remotely located lubricating system.

In accordance with the present invention, there is provided an electrically driven lubricating device capable of delivering clean shots of lubricant simultaneously to as many points on the conveyor system as desired. The shots of lubricant are delivered almost instantaneously when the conveyor system has arrived at a designated location, so that the shots of lubricant can be made to land accurately on precisely the areas required to be lubricated. In addition, the volume of each shot can be individually controlled so as to be appropriate to the requirements of the particular point of the system. Further, since the lubricating device is electrically driven by means independent of that used to drive the conveyor, a large number of individual points in the conveyor system can be lubricated simultaneously at high speed without any adverse effect on the operation of the conveyor itself.

Briefly described, the lubricating device of the invention as shown in the sole FIGURE comprises four major elements, namely, an electric motor, a positive displacement lubricant pump comprising a plurality of individual cylinders and associated pistons driven by a common shaft, a single revolution clutch coupling the output of the motor to the shaft of the lubricant dispenser, and a sensing and control system actuated by the moving conveyor which at an appropriate time causes the clutch to engage the motor to the shaft of the lubricant pump for a single revolution, causing the ejection of a plurality of individual clean shots of lubricant which are directed to selected portions of the conveyor system by individual conduits.

During operation of the device of the invention, the motor turns continuously, but in a free-wheeling condition since the clutch is normally disengaged. A suitable signal from the control system causes the clutch to couple the motor to the lubricant pump for a single revolution of the motor, causing individual shots of lubricant to be delivered during the short time required for a single revolution of the motor. Accordingly, the delivery of the clean shots of lubricant is precisely timed, thus permitting accurate placement of the lubricant on the desired points of the conveyor system to be lubricated. Moreover, since the output of the cylinders in the lubricant pump can be individually adjusted, the quantity of fluid delivered to each lubricating point can be controlled as required.

The invention will be better understood from the following detailed description thereof, taken in conjunction with the accompanying drawing, which is a partially schematic elevation of a typical embodiment of the invention arranged to deliver a plurality of lubricating shots to desired points on a moving conveyor.

In a typical embodiment of the invention, the apparatus comprises a base 10 on which are mounted electric motor 11 and a multiple piston metering pump 12. The shaft 13 of motor 11 is connected by a conventional coupling 14 to the input or driving end of single revolution clutch 17. The output or driven end 18 of clutch 17 is connected to shaft 19 of pump 12. The ends of shaft 19 are supported for rotation in bearings 21 and 22. A single rotation of shaft 19 causes a clean shot of lubricant to be delivered from each of the outlet ports 20 in a manner to be described.

Associated with clutch 17 is a control unit 23, and an electrical switch 24 which is actuated by a feeler arm 26 positioned to make intermittent contact with a conveyor chain 27 comprising individual links 28 coupled together by pins 29. An output signal produced at appropriate intervals by control unit 23 is carried by electrical conductors 31 and 32 to solenoid 33 of single revolution clutch 17. Power for operation of control unit 23 and solenoid 33 is provided to terminals 35 and 36 from a suitable source (not shown).

Clutch 17 is of the variety known as a single revolution clutch as described, for example, in U.S. Pat. No. 3,373,851, issued March 19, 1965. A specific example of a clutch of this type suitable for use in the present invention is identified as model CB-4-CW-1 and is available from PSI Division, Warner Electric Brake and Clutch Company, Pitman, New Jersey.

In operation of the device of the invention, clutch 17 is normally disengaged except during the time when a shot of lubricant is actually being delivered. Accordingly, although motor 11 is turning at a relatively high rate of speed, e.g., 1140 rpm, no torque is transmitted to shaft 19 through clutch 17. When moving conveyor chain 27 reaches a point appropriate for application of lubricant thereto, feeler arm 26 is deflected by contact with an appropriate portion of the conveyor chain, such as the hinge pin 29 connecting adjacent links 28. When deflected, feeler arm 26 operates switch 24, causing control unit 23 to emit an electrical sensing pulse to solenoid 33 of single revolution clutch 18. The sensing pulse causes clutch 17 to engage, thus coupling rotating motor shaft 13 to pump shaft 19. On completion of a single revolution of motor shaft 13, clutch 17 disengages, permitting motor shaft 13 to run in a free wheeling condition.

A single revolution of shaft 19 of pump 12 causes a single shot of lubricant to be dispensed from each of outlet ports 20 of the pump. Multiple piston metering pumps of the type useful in the invention are commercially available. A suitable pump, identified as model SV Lubricator, is available from Madison-Kipp Corporation, Madison, Wisconsin. The operation of pump 12 is indicated schematically in the broken-away section shown in the drawing. As shown, eccentric cam 37 attached to shaft 19 rotates with the shaft and causes piston 38 to rise against the biasing pressure of return spring 39. Lubricant contained within cylinder 41 is compressed by upward movement of the piston and ejected through exit port 20, which is provided with a suitable outlet check valve, not shown. After shaft 19 of pump 12 has rotated sufficiently to pass the high point of cam 37, return spring 39 serves to lower piston 38 and thereby create a suction within cylinder 41 whereby lubricant is drawn through supply tube 42 and inlet check valve 44 into the interior of the cylinder from a pool 43 thereof in the base of the pump. The supply of lubricant within the pump is maintained at a constant level by suitable means, not shown.

The metering pump used in the present invention, is of a conventional design and has been used in the past to provide oil as necessary in moderate quantities to various points in a machine requiring lubrication. In the past, however, such pumps have been rotated at a relatively low speed causing the lubricant to be supplied as a series of drops through a closed system. The single revolution clutch used in the present invention, in conjunction with the high speed motor used to drive the apparatus, causes the pump to deliver the individual shots of oil at high speed in the form of a jet rather than as a series of individual drops.

In order for the apparatus of the invention to work in its intended manner, it is essential that the shaft 19 of pump 12 be rotated rapidly so that the delivered shot of lubricant builds up a sufficient velocity to strike the intended portion of the conveyor or other apparatus to be lubricated. In order to achieve this result, the injection stroke of the pump must be completed in a time which is generally on the order of 0.4 seconds or less. Accordingly, it is preferred that the motor used in the invention have a speed of at least about 140 rpm. Moreover, it is important, in order to avoid dribbling or the deposition of lubricant at undesired portions of the apparatus, that only a single revolution of the shaft of the pump be obtained for each control pulse produced by control unit 23. The mechanical timing problem involved in achieving this result is solved by means of single revolution clutch 17 and the rapidly rotating shaft of motor 11. Since motor 11 is turning at a relatively high rate of speed, the engagement to the shaft of the pump achieved by the clutch for a single revolution permits the pump to be precisely timed to produce clean shots of lubricant contemplated by the invention.

The foregoing detailed description as been given for clearness of understanding only, and no unnecessary limitations should be understood therefrom, as modifications will be obvious to those skilled in the art.

We claim:

1. A lubricating system for delivering a clean shot of a fluid lubricant to a selected point on a moving conveyor or the like, said system comprising:
   a positive displacement metering piston pump actuated by a rotatable shaft, said pump being adapted to deliver a predetermined volume of lubricant on each revolution of said shaft;
   a single revolution clutch having a driven end and a driving end, said driven end being operatively connected to said shaft of said pump;
   an electric motor operatively connected to the driving end of said clutch; and
   a control system for actuating said clutch to couple said motor to said pump for a single revolution of said shaft when said conveyor has arrived at a predetermined location, whereby said pump delivers a clean shot to a predetermined section of said conveyor.

2. A lubricating system in accordance with claim 1 wherein said motor is directly coupled to said clutch and has a free-running speed of at least 140 rpm.

3. A lubricating system in accordance with claim 1 wherein said pump is adapted to deliver a plurality of individual clean shots of lubricant on each revolution of said rotatable shaft.

4. A lubricating system for delivering a plurality of clean shots of a fluid lubricant to selected points on a moving conveyor or the like, said system comprising:
   a positive displacement metering multi-piston pump actuated by a rotatable shaft, each of said pistons being adapted to deliver a predetermined volume of lubricant to an associated outlet port on each revolution of said shaft;
   a plurality of conduits each leading from one of said outlet ports to a location adjacent a selected point to be lubricated on said conveyor;
   a control system including means for generating an electrical signal pulse when said moving conveyor reaches a location suitable for the application of lubricant through said conduits;
   an electric motor;
   a single revolution clutch interconnecting the output of said motor and said rotatable shaft, said clutch being normally disengaged and being adapted to respond to a control pulse from said control system to engage said motor and said shaft for a single revolution of said shaft, whereby a clean shot of lubricant is delivered through each of said conduits to said selected points on said conveyor.

5. A lubricating system in accordance with claim 4 wherein said single revolution of said clutch occurs within not more than about 0.4 seconds.

* * * * *